April 16, 1968        G. KIPER        3,377,937
CAMERA SHUTTERS
Original Filed Feb. 23, 1965
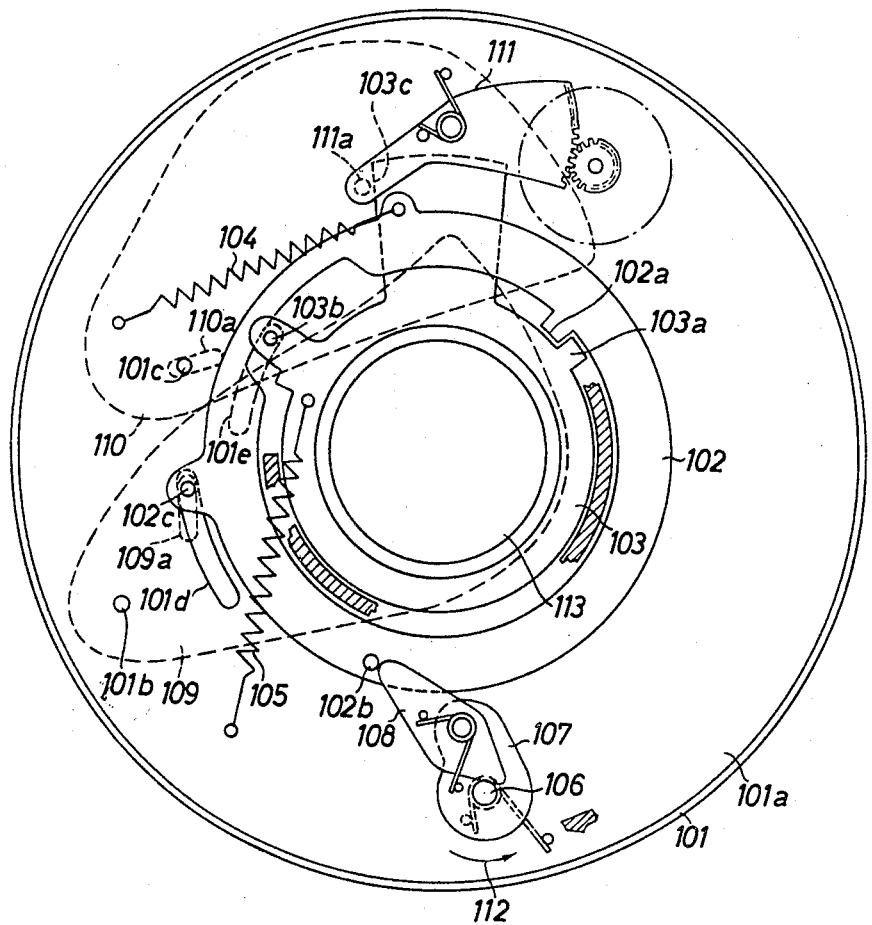
INVENTOR.
GERD KIPER
BY
Michael J. Striker 3,377,937
CAMERA SHUTTERS
Gerd Kiper, Unterhaching, Munich, Germany, assignor to Agfa Aktiengesellschaft, Leverkusen, Germany
Continuation of application Ser. No. 434,273, Feb. 23, 1965. This application June 19, 1967, Ser. No. 647,253
Claims priority, application Germany, Mar. 21, 1964, A 45,562
11 Claims. (Cl. 95—60)

ABSTRACT OF THE DISCLOSURE

A shutter with two blades each pivotable with reference to a stationary support and each pivotably connected to a separate ring. The rings rotate in unison in one direction to cock the shutter but one thereof can move to uncocked position ahead of the other or trailing ring whereby the shutter opens. The exposure time is determined by a retard mechanism which cooperates with the trailing ring.

---

This application is a continuation of application Ser. No. 434,273, Feb. 23, 1965.

The present invention relates to cameras.

More particularly, the present invention relates to camera shutters.

Thus, the present invention relates to between-the-lens camera shutters of the type which include a pair of blades which are actuated in order to expose film in the camera.

One of the objects of the present invention is to provide a camera shutter of this type which is capable of producing exceedingly short exposure times. Heretofore in between-the-lens camera shutters which included only a pair of shutter blades it was not possible to provide exceedingly short exposure times, and with the present invention it does become possible to achieve this result.

Another object of the present invention is to provide a camera shutter of the above type which has a construction of such compactness that without any difficulty whatsoever it is possible to include in the shutter housing such structures as elements of a flash apparatus for making flash exposures, elements for making time exposures, a self-timer mechanism for automatically delaying the running down of the shutter for a given period of time, and also structure for automatically setting the shutter according to the lighting conditions.

In addition, it is an object of the present invention to provide a shutter of the above type which will not undesirably increase the exposure time when the size of the aperture of the diaphragm is reduced. In many conventional shutters the stopping down of the diaphragm to a smaller aperture has been unavoidably accompanied by an increase in exposure time, and this drawback is also avoided with the structure of the present invention.

In addition, it is an object of the present invention to provide a structure of the above type which is exceedingly simple while at the same time being composed of rugged elements which will operate reliably.

With the above objects in view the invention includes, in a camera shutter, a support means and a pair of shutter blades supported by the support means for movement relative thereto. A pair of drive means are carried by the support means also for movement relative thereto, and this pair of drive means are respectively operatively connected to the pair of shutter blades for moving the latter relative to the support means. In addition, a coupling means couples the pair of drive means to each other for movement together during at least part of the operation of the shutter.

The novel features which are considered as characteristic for the invention are set forth in particular in the appended claims. The invention itself, however, both as to its construction and its method of operation, together with additional objects and advantages thereof, will be best understood from the following description of one possible embodiment of a structure illustrated in the accompanying drawing which shows schematically in a plane normal to the optical axis the details of one possible structure according to the present invention.

Referring now to the drawing, there is shown therein a shutter housing 101 of a between-the-lens shutter according to the present invention. This shutter housing includes in addition to its outer cylindrical wall, a transverse wall 101a which is situated in a plane normal to the optical axis and which is in the form of a plate formed with a central exposure aperture 113 of circular configuration through the center of which the optical axis extends, this optical axis coinciding with the axis of the cylindrical outer wall of the shutter housing 101. This plate or wall 101a forms a support means which carries the other components of the shutter of the invention.

These other components include a pair of shutter drive means 102 and 103 in the form of a pair of rings which are supported by the support means 101a for rotary movement about the optical axis, these rings being coaxial and being of a circular configuration. The optical axis extends through the center of the shutter drive rings 102 and 103. A means is provided for coupling the pair of drive means 102 and 103 to each other during at least part of the operation of the shutter, and this coupling means takes the form of a motion-transmitting structure formed by a pair of lugs 102a and 103a of the rings 102 and 103, respectively, these lugs engaging each other so that when the ring 102 is turned in a clockwise direction, as viewed in the drawing, its lug 102a will engage the lug 103a and thus transmit to the ring 103 the clockwise turning of the ring 102, so that in this way both of these rings turn simultaneously in a clockwise direction, as viewed in the drawing. A drive spring 104 is tensioned between the support means 101a and the ring 102 for urging the latter to return from a cocked position to a run-down position, and a second drive spring 105 is tensioned between and operatively connected to the support means 101a and the ring 103 for urging the latter to return from its cocked to a run-down position.

A manually operable cocking means is provided for cocking the shutter, and this manually operable cocking means includes a rotary shaft 106 which is capable of being manually turned in the direction of the arrow 112 by the operator through an unillustrated transmission which is accessible to the operator and which is connected with the shaft 106 so as to enable the operator to turn this shaft. The rotary shaft 106 fixedly carries a lever 107 which in turn pivotally carries a second lever 108, and a spring is coiled about the pivot pin carried by the lever 107 and engages the pins respectively carried by the levers 107 and 108 for urging the lever 108 into engagement with the shaft 106, as shown in the drawing. In addition, a spring is coiled about the shaft 106 and engages pins respectively carried by the lever 107 and the support means 101a for urging the shaft 107 to turn in a clockwise direction, as viewed in the drawing, to a predetermined rest position where the lever 107 engages any suitable stop member fixedly carried by the support means 101a. The cocking means includes, in addition, a pin 102b fixedly carried by the ring 102 and located in the path of turning of the lever 108 when the lever 107 is turned by the operator in the direction of the arrow 112, so that at this time the lever 108 will engage the pin 102b and displace the ring 102 in opposition to the spring 104 in a counterclockwise direction, as viewed in the drawing. Of course, the transmission 102a, 103a transmits the turning of the ring 102 at this time to the ring 103 which thus turns together with the ring 102 in a clockwise direction, as viewed in the drawing. The parts are shown in the drawing when they have almost reached their cocked position. An instant after the lever 108 turns in the direction of the arrow 112 slightly beyond the position shown in the drawing, the tip of the lever 108 will move beyond the pin 102b so as to release the ring 102 for running down movement by the force of the spring 104, and in this way the elements 106–108 form a shutter cocking and release means for cocking the shutter and releasing the latter immediately upon cocking thereof. Of course, during clockwise turning of the ring 103 the spring 105 is also tensioned so that when the lever 108 moves beyond the pin 102b the spring 105 also seeks to return the ring 103 from its cocked to its run-down position.

However, the ring 103 cannot immediately return to its run-down position together with the ring 102. The reason for this is that a retarding means which is carried by the support means 101a cooperates with the ring 103 to retard the running down movement thereof so as to provide a preselected exposure time or an automatically determined exposure time in a camera where the exposure time is determined automatically in accordance with the lighting conditions. Thus, it will be seen that the ring 103 has a radial projection provided with an edge 103c which engages a pin 111a of a lever 111 of a conventional retarding means which can be set to provide predetermined exposure times with an unillustrated and well known exposure-time adjusting structure. This lever 111 is supported intermediate its ends for turning movement and is urged by a spring to turn in a counterclockwise direction, as viewed in the drawing, and when during clockwise turning of the ring 103, when the shutter is cocked, the edge 103c moves to the right beyond the pin 111a the lever 111 turns to the position shown in the drawing where the pin 111a is located to the left of the edge 103c, and the extent to which the pin 111a moves along the edge 103c toward the optical axis is determined by the structure which sets the exposure time. The spring 105 seeks to return the ring 103 in a counterclockwise direction from its cocked to its run-down position, and this turning of the ring 103 is resisted by engagement of the edge 103c with the pin 111a, but the force of the spring causes the pin 111a to gradually approach the outer end of the edge 103c while the lever 111 is turned in a clockwise direction until the pin 111a reaches the outer end of the edge 103c whereupon the spring 105 can then very rapidly return the ring 103 to its run-down position. The lever 111 is in the form of a gear sector meshing with a pinion which is coaxially fixed with a rotary mass, for example, whose inertia provides the retarding force, this pinion and rotary mass being supported for rotary movement on a suitable pin carried by the support means 101a, and in this way the return of the ring 103 is retarded so as to provide a given exposure time.

In the example of the structure illustrated in the drawing, the rings 102 and 103 are situated on that side of the plate 101a which is visible in the drawing, while at the other side of the plate 101a are situated the pair of shutter blades 109 and 110 which are connected by a first pair of means to the support means 101a so as to be supported thereby for turning movement relative to the support means. This first pair of means includes a pivotal connection 101b for the blade 109 and a pin-and-slot connection 101c, 110a for the blade 110. Thus, the plate 101a fixedly carries a pivot pin 101b which extends into an opening of the blade 109 so that in this way the blade 109 can turn with respect to the support means 101a about the axis of the pin 101b. In addition, the blade 110 is formed with a slot 110a which receives a pin 101c, so that through this pin-and-slot connection the blade 110 is connected to the support means 101a for movement relative thereto.

A second pair of means are provided for connecting the pair of blades 109 and 110 respectively to the rings 102 and 103, and this second pair of means includes a pin-and-slot connection 102c, 109a connecting the ring 102 to the blade 109 and a pivotal connection 103b connecting the blade 110 to the ring 103. Thus, the pin-and-slot connection of the blade 109 to the ring 103 includes a slot 109a formed in the blade 109 and receiving a pin 102c which is fixed to the ring 102. The pivotal connection of the blade 110 to the ring 103 includes a pin 103b which is fixed to the ring 103 and which is received in an opening of the blade 110. Thus, while the blade 110 has a pin-and-slot connection to the support means and a pivotal connection to the drive means which is formed by the ring 103, the blade 109 has a pin-and-slot connection to the drive means formed by the ring 102 and a pivotal connection to the support means 101a. In order to provide for unrestricted movement of the pins 102c and 103b, the plate 101a is formed with a pair of arcuate slots 101d and 101e through which the pins 102c and 103b respectively extend, these pins of course turning about the optical axis inasmuch as they are connected to the rings 102 and 103, respectively, so that the slots 101d and 101e respectively extend along circles whose centers coincide with each other and with the optical axis.

When the operator turns the manually operable cocking and release means 106–108 in the direction of the arrow 112 in order to make an exposure, the lever 108 will of course engage the pin 102b so as to simultaneously turn both of the rings 102 and 103 in a clockwise direction, as pointed out above, thus tensioning the springs 104 and 105. During this movement the blade 109 turns in a counterclockwise direction about the pin 101b while the pin 102c moves along the slot 109a in a clockwise direction, so that the blade 109 is displaced upwardly to the position shown in the drawing just prior to release for making an exposure. At the same time the pin 103b turns in a clockwise direction so as to displace the slot 110a of the blade 110 along the stationary pin 101c resulting also in counterclockwise turning of the blade 110 about the pin 110c while the blade 110 is simultaneously displaced along the pin 101c. The positions of the pair of pivotal connections and pin-and-slot connections provided for the blades are such that while these blades turn simultaneously in the same direction and with respect to each other, nevertheless during cocking of the shutter the aperture 113 remains closed. Of course, just prior to the end of the cocking movement of the shutter the pin 111a will move along side of the edge 103c of the radial projection of the ring 103.

At the end of the cocking movement the lever 108 moves beyond the pin 102b, so that the ring 102 is immediately turned in a counterclockwise direction back to its run-down position. As a result the blade 109 is turned in a clockwise direction about the pin 101b, thus uncovering the opening 113 in order to initiate the exposure. In the event that the ring 103 is released by the retarding means 111 only when the blade 109 has completely uncovered the opening 113 or has even remained for a period of time at its run-down position, then a relatively long exposure time is provided because the length of time required for closing of the opening 113 by the second blade 110 is relatively great. However, if the retarding means 111 is set to provide a relatively short exposure time, the blade 110 can be released to close the opening 113 when this opening has not been completely uncovered by the blade 109, and in this case an arcuate gap, having substantially the configuration of an arc of a circle, is defined between the blades 109 and 110 and sweeps across the opening 113 so as to provide a relatively short exposure time. Since it is possible, when providing short exposure times, to actuate the shutter of the invention in such a way that the entire opening 113 is never completely uncovered at any given instant during operation of the shutter, it is possible with the structure of the invention to provide an exposure time whose magnitude is considerably shorter than has heretofore been attainable with known shutters of similar size and operating characteristics. A further advantage achieved by the shutter of the invention is that when the diaphragm is stopped down so as to provide relatively small apertures, there is no increase in the effective exposure time.

Of course, the invention is not limited to the specific details described above and shown in the drawing. Thus, the manner in which the blades are supported for movement can be identical for each blade, so that both of them are, for example, pivotally connected to the support means 101a. Moreover, the pair of drive means formed by the rings 102 and 103, which are concentric with the optical axis, can be provided with further control elements such as structure for synchronizing the operation of the shutter with a flash apparatus, structure for providing time exposures, and structure for optionally connecting to the shutter a self-timer which will delay the operation of the shutter for a given period of time. Furthermore, the principles of the invention are equally applicable to shutters which are capable of being cocked while being retained in their cocked position until released by the operator at a later time. The particular manner in which the blades of the shutter are mounted for movement and controlled, as described above and shown in the drawing, can be provided with innumerable variations in the manner in which the mounting and control elements can be interchanged and combined so as to provide any desired combination of pivot axes and pin-and-slot connections and so as to include additional blades for covering the opening 113 and for following the blades 109 and 110 in order to provide a desired type of shutter operations. Instead of using drive rings, the pair of drive means can take the form of a pair of slide members which move longitudinally along linear paths to drive the blades, or a known parallelogram linkage can be used for driving the blades, as well as other simpler driving elements. The turning points of such linkages will for the most part not coincide with the stationary turning axes at the pivotal connections of the blades to the support means 101a. However, in this case also variations are possible so that, for example, one of the drive means takes the form of a ring while the other of the drive means takes the form of a lever or a longitudinally shiftable slide.

However, it is emphasized that the structure described above and illustrated in the drawing, which includes the pair of concentric rotary drive rings 102 and 103, is preferred to any of the above variations, even though this particular construction might be slightly more costly than other variations, because the illustrated structure which has been described above is exceedingly compact and leaves around the rings 102 and 103 between the latter and the outer cylindrical wall of the housing 101 a relatively large free space in which it is possible to accommodate without difficulty such structures as flash-synchronizing structure, structure for providing time exposures, a self-timer structure for delaying the action of the shutter, and structure for automatically setting the exposure time and/or the exposure aperture.

Furthermore, while in the illustrated example a single manually operated shutter cocking and release means is provided to cooperate only with the ring 102 while the transmission means 102a, 103a transmits the turning of the ring 102 to the ring 103 during cocking of the shutter, it is possible instead to provide a pair of manually operable means which respectively cooperate with the pair of rings 102 and 103 so that these rings can be cocked by operation of such a pair of manually operable cocking and releasing means. With such construction each of the rings 102 and 103 would be provided with a projection in the form of a pin or lug, and these pins or lugs would respectively be engaged by camming portions of the pair of manually operable shutter-cocking and release means.

It will be understood that each of the elements described above, or two or more together, may also find a useful application in other types of camera differing from the types described above.

While the invention has been illustrated and described as embodied in camera shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera shutter, a combination comprising support means; blade means consisting of two shutter blades each mounted on said support means for simultaneous turning relative to said support means as well as for turning relative to said support means independently of each other; a pair of drive means both supported by said support means and each connected operatively to a different one of said shutter blades for turning the respective blade relative to said support means; and coupling means connecting said drive means with freedom of movement relative to each other so that at least one of said drive means can move the other drive means through the intermediary of said coupling means and that each of said drive means can move the respective blade independently of the other drive means.

2. A combination as defined in claim 1, wherein each of said drive means comprises a ring concentrically surrounding the optical axis and wherein said support means has a light-admitting opening through which said optical axis extends.

3. A combination as defined in claim 1, wherein said coupling means comprises a pair of projections each fixed to one of said drive means, said projections engaging each other during movement of said pair of drive means from uncocked to cocked position, and further comprising cocking means operatively connected to one of said drive means for displacing the latter and through said pair of projections the other of said drive means to said cocked position, said cocking means releasing said one drive means for return to its uncocked position in advance of the other drive means.

4. A combination as defined in claim 1, further comprising a pair of cocking means each connected operatively to one of said drive means for simultaneously displacing said drive means from uncocked to cocked positions.

5. A combination as defined in claim 4, wherein each of said drive means comprises a projection and each of said cocking means comprises a camming portion engaging the respective projection during displacement of said drive means to cocked positions.

6. A combination as defined in claim 1, wherein said support means includes a shutter housing and wherein said coupling means is arranged to connect said drive means to each other for simultaneous movement during cocking of the shutter, one of said drive means trailing the other during movement of said drive means from a cocked position to an uncocked position, and further comprising a pair of resilient means for respectively biasing said drive means to uncocked positions and retarding means operatively connected to said trailing drive means for releasing the latter for movement from cocked to uncocked position in response to bias of the respective resilient means after the other drive means has been released for movement from cocked to uncocked position in response to bias of the respective resilient means.

7. A combination as defined in claim 1, wherein each of said drive means comprises a ring turnable relative to said support means between cocked and uncocked positions and said coupling means comprises motion transmitting means operatively connected with said rings for transmitting motion from one of said rings which is a leading ring to the other ring which is a trailing ring during turning of said rings to cocked positions, and further comprising a first pair of means each connecting said support means with a different one of said blades for simultaneous and independent turning movement relative to said support means, a second pair of means each connecting one of said blades to a different one of said rings for turning movement relative to said support means in response to turning of the respective ring, manually operable cocking means operatively connected to said leading ring for displacing the latter to cocked position whereby said motion transmitting means cocks said trailing ring, and retarding means carried by said support means and operatively connected with said trailing ring for retarding the return thereof to uncocked position after the leading ring has been released for movement to uncocked position.

8. A combination as defined in claim 7, wherein one of said first pair of means includes a pivotal connection of one of said blades to said support means and the other of said first pair of means includes a pin-and-slot connection of the other blade to said support means.

9. A combination as defined in claim 7, wherein one of said second pair of means includes a pivotal connection of one of said blades to one of said rings and the other of said second pair of means includes a pin-and-slot connection of the other blade to the other ring.

10. A combination as defined in claim 7, wherein one of said first pair of means includes a pivotal connection of one of said blades to said support means and the other of said first pair of means includes a pin-and-slot connection of the other blade to said support means, one of said second pair of means including a pin-and-slot connection of said one blade to one of said rings and the other of said second pair of means including a pivotal connection of said other blade to the other ring.

11. In a camera shutter, in combination, support means; a pair of shutter blades; a first pair of means respectively connecting said shutter blades to said support means for turning movement relative thereto, one of said first pair of means including a pivotal connection of one of said blades to said support means and the other of said first pair of means including a pin-and-slot connection of the other of said blades to said support means; leading and trailing rotary shutter rings respectively supported for rotary movement by said support means; a second pair of means respectively connecting said pair of blades to said pair of rings for turning movement relative to said support means in response to turning of said rings, said rings being turnable from a rundown position to a cocked position, one of said second pair of means including a pin-and-slot connection of said one blade to one of said rings and the other of said second pair of means including a pivotal connection of the other of said blades to the other of said rings, said support means including a plate situated between said blades, on the one hand, and said rings, on the other hand, and said plate being formed with a pair of slots through which pins of said pin-and-slot connections respectively extend; motion-transmitting means operatively connected to said rings for transmitting motion of said leading ring to said trailing ring during displacement of said rings from said run-down to said cocked position; manually operable cocking means operatively connected to said leading ring for displacing the latter from said run-down to said cocked position, said motion-transmitting means transmitting displacement of said leading ring to said trailing ring for displacing the latter simultaneously from said run-down to said cocked position; and retarding means carried by said support means and operatively connected to said trailing ring for retarding the return thereof from said cocked to said run-down position after said leading ring has been released for running down movement from said cocked to said run-down position.

References Cited

UNITED STATES PATENTS 2,578,604  12/1951  Santoni _____ 95—63
2,890,640   6/1959  Noack _____ 95—63

JOHN M. HORAN, *Primary Examiner.*